US012601410B2

(12) United States Patent
Wang et al.

(10) Patent No.: US 12,601,410 B2
(45) Date of Patent: Apr. 14, 2026

(54) FLUID CONTROL ASSEMBLY

(71) Applicant: ZHEJIANG SANHUA AUTOMOTIVE COMPONENTS CO., LTD., Hangzhou (CN)

(72) Inventors: Lixin Wang, Hangzhou (CN); Jinghui Zhu, Hangzhou (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 103 days.

(21) Appl. No.: 18/692,328

(22) PCT Filed: Sep. 16, 2022

(86) PCT No.: PCT/CN2022/119197
§ 371 (c)(1),
(2) Date: Mar. 15, 2024

(87) PCT Pub. No.: WO2023/041001
PCT Pub. Date: Mar. 23, 2023

(65) Prior Publication Data
US 2025/0137539 A1      May 1, 2025

(30) Foreign Application Priority Data

Sep. 16, 2021   (CN) .......................... 202111086049.X

(51) Int. Cl.
*F16K 11/085* (2006.01)
*F16K 11/072* (2006.01)

(52) U.S. Cl.
CPC .......... *F16K 11/085* (2013.01); *F16K 11/072* (2013.01)

(58) Field of Classification Search
CPC ..... Y10T 137/86493; Y10T 137/86541; Y10T 137/86566; F16K 11/085; F16K 11/072; F16K 11/0856; F16K 27/065
See application file for complete search history.

(56) References Cited

U.S. PATENT DOCUMENTS 1,188,085 A * 6/1916 Krupp ................. F16K 11/0856
                                              122/13.01
1,571,810 A * 2/1926 Shimp ................. F16K 11/0836
                                              137/625.11

(Continued)

FOREIGN PATENT DOCUMENTS

CN        102667276 B      3/2014
CN        108692066 A      10/2018

(Continued)

OTHER PUBLICATIONS

Machine Translation of WO2011048724 retrieved from espacenet. com. (Year: 2025).*

(Continued)

*Primary Examiner* — Jessica Cahill
(74) *Attorney, Agent, or Firm* — Yue (Robert) Xu; Apex Attorneys at Law, LLP

(57)        ABSTRACT

A fluid control assembly having an accommodation chamber is provided, including a valve body and a valve core. The valve body includes a side wall portion forming at least part of a peripheral wall of the accommodation chamber, the fluid control assembly includes at least two columns of communication ports spaced apart in a circumferential direction of the side wall portion, each column includes at least two communication ports spaced apart in an axial direction; at least part of the valve core is in the accommodation chamber, and the valve core includes an outer communication chamber having at least one shared communication channel. In two operation modes, at least two communication ports (Continued)

respectively from the at least two columns are in communication through a same shared communication channel.

17 Claims, 16 Drawing Sheets

(56)                 References Cited

U.S. PATENT DOCUMENTS

| | | | | |
|---|---|---|---|---|
| 4,355,659 | A * | 10/1982 | Kelchner | F16K 11/0856 |
| | | | | 137/625.19 |
| 4,716,923 | A * | 1/1988 | West | F16K 11/0856 |
| | | | | 137/625.29 |
| 5,816,290 | A | 10/1998 | Altshuler | |
| 10,337,626 | B2 * | 7/2019 | Takamatsu | F16K 11/076 |
| 2017/0254425 | A1 * | 9/2017 | Takamatsu | F16K 37/005 |
| 2018/0292016 | A1 | 10/2018 | Ledvora et al. | |
| 2021/0131575 | A1 | 5/2021 | Bunda et al. | |

FOREIGN PATENT DOCUMENTS

| | | | | | |
|---|---|---|---|---|---|
| CN | 111828682 | A | 10/2020 | | |
| CN | 112555462 | A | 3/2021 | | |
| CN | 112879601 | A | 6/2021 | | |
| CN | 112901823 | A | 6/2021 | | |
| CN | 112901824 | A | 6/2021 | | |
| WO | 2007112532 | A1 | 10/2007 | | |
| WO | WO-2011048724 | A1 * | 4/2011 | ......... | F16K 11/0856 |

OTHER PUBLICATIONS

Japanese First Office Action issued on Feb. 4, 2025 for the Japanese counterpart application No. 2024-514750.

International Search Report for PCT/CN2022/119197 mailed Dec. 9, 2022 2022, ISA/CN.

Extended European Search Report issued on Jul. 31, 2025 for European counterpart application No. 22869368.5.

\* cited by examiner

1000

A-A

B-B

C-C

D-D

E-E

CA4

| | |
|---|---|
| P9 | P10 |
| P7 | P8 |
| P5 | P6 |
| P1 | P2 |
| P3 | P4 |

FP

FP

FP

FP

216/21

215/21

214/21

213/21

CA2

| P9 | P10 |
| P7 | P8 |
| P5 | P6 |
| P1 | P2 |
| P3 | P4 |

FP

FP

IND/21

IND

IND

FP

FP

IND

FP

FP

IND

CA4

FLUID CONTROL ASSEMBLY

The present application is the national phase of International Application No. PCT/CN2022/119197, titled "FLUID CONTROL ASSEMBLY", filed on Sep. 16, 2022, which claims priority of Chinese Patent Application No. 202111086049.X, titled "FLUID CONTROL ASSEMBLY", filed with the China National Intellectual Property Administration on Sep. 16, 2021, the entire disclosures thereof are incorporated herein by reference.

FIELD

The present application relates to the technical field of fluid control, and in particular to a fluid control assembly.

BACKGROUND

In general, a fluid control assembly is required in a thermal management system for controlling fluids in multiple flow passages. The fluid control assembly includes a valve core and communication ports, and various communication manners among multiple communication ports can be realized by rotation of the valve core, so as to satisfy the control demands for fluids in multiple flow passages in the thermal management system.

For implementing different communication manners among the multiple communication ports through one fluid control assembly, an urgent problem to be solved is to simplify the structure of the fluid control assembly in design.

SUMMARY

An object of the present application is to provide a fluid control assembly, which is beneficial to simplifying the structure of the fluid control assembly.

A fluid control assembly provided according to an embodiment of the present application includes an accommodation chamber, where the fluid control assembly includes a valve body and a valve core, where the valve body includes a side wall portion that forms at least part of a peripheral wall of the accommodation chamber;

the fluid control assembly is provided with at least two columns of communication ports which are spaced apart in a circumferential direction of the side wall portion, the at least two columns of communication ports are located on the valve body, where each column of the communication port sets includes at least two communication ports spaced apart in an axial direction of the side wall portion; and at least part of the valve core is in the accommodation chamber and can rotate, where the valve core includes outer communication chamber, and the outer communication chamber includes at least one shared communication channel, where a flow cross-sectional area of an opening, facing the side wall portion, of each of the at least one shared communication channel is larger than three times a flow cross-sectional area of each of the corresponding communication ports.

The fluid control assembly has at least two operation modes, in two of which at least two of the communication ports respectively from the at least two columns of the communication ports are in communication through a same one of the at least one shared communication channel.

The fluid control assembly according to the embodiment of the present application includes at least two columns of communication ports, each column includes at least two communication ports spaced apart in the axial direction of the side wall portion. The valve core is provided with at least one shared communication channel, in two operation modes, at least two of the communication ports respectively from the at least two columns of the communication ports are in communication through the same shared communication channel. Therefore, the structure of the fluid control assembly can be simplified, and different communication manners between the multiple communication ports can be implemented.

DETAILED DESCRIPTION OF THE EMBODIMENTS

Figure 1:
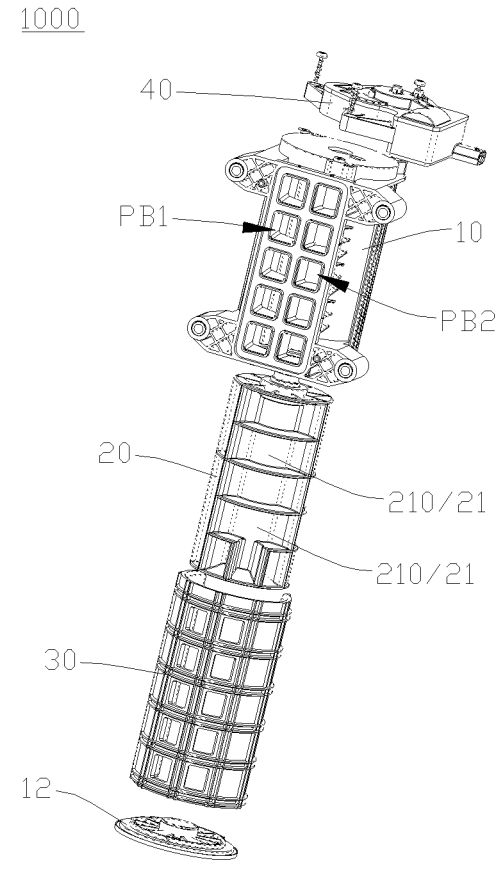
FIG. 1 is a schematic exploded view showing the structure of a fluid control assembly according to an embodiment of the present application.
Figure 2:
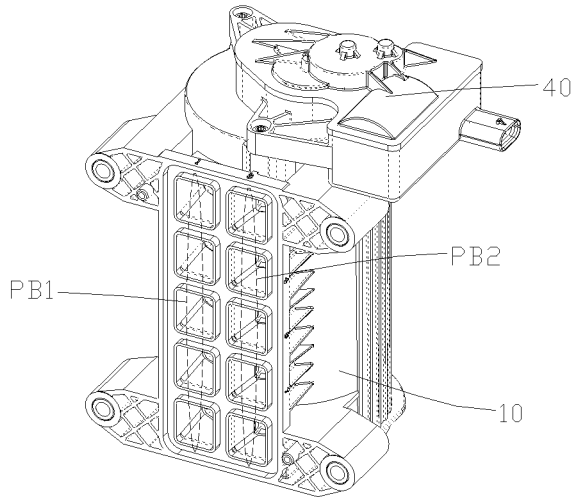
FIG. 2 is a schematic view showing the three-dimensional structure of a fluid control assembly according to an embodiment of the present application.
Figure 3:
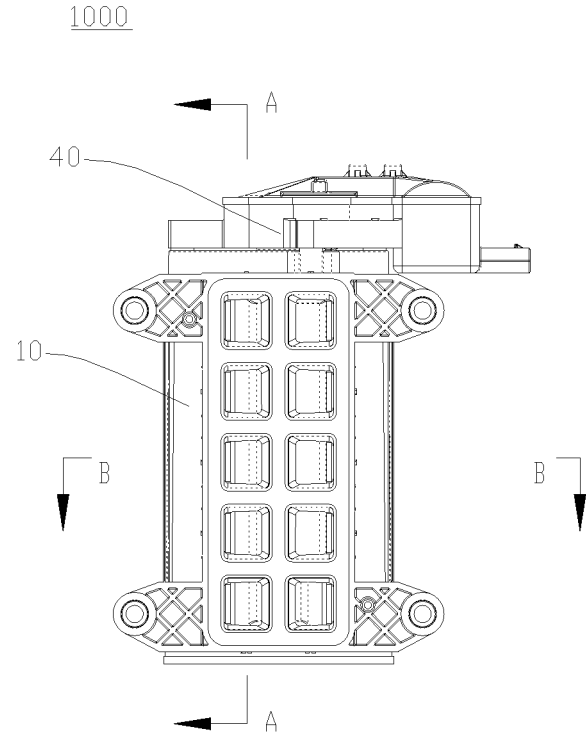
FIG. 3 is a schematic front view showing the structure of the fluid control assembly shown in FIG. 2.
Figure 4:
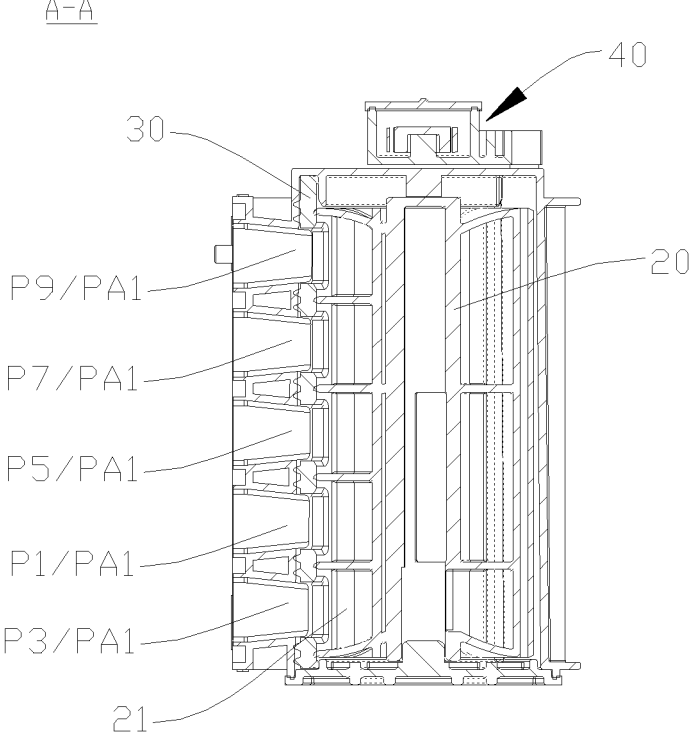
FIG. 4 is a schematic cross-sectional view of the fluid control assembly shown in FIG. 3 taken along line A-A.
Figure 5:
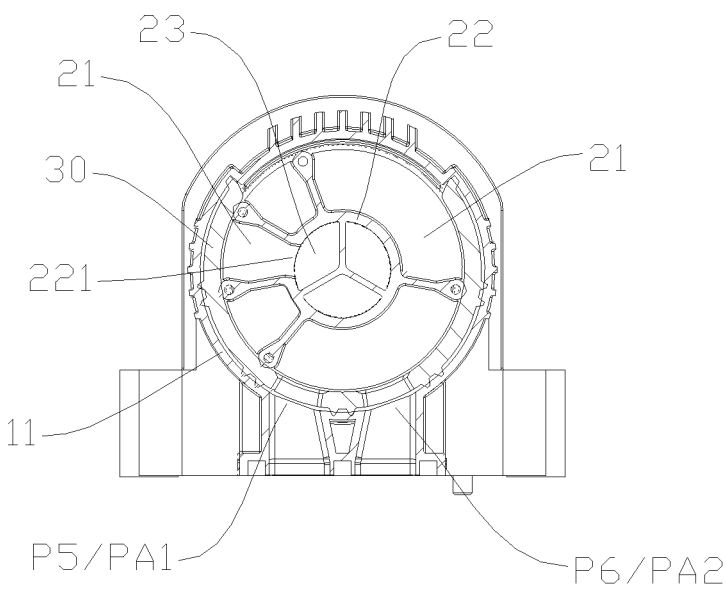
FIG. 5 is a schematic cross-sectional view of the fluid control assembly shown in FIG. 3 taken along line B-B.

The characteristics and exemplary embodiments of various aspects of the application will be described in detail below. In order to make the object, technical solution and advantages of the application clearer, the application will be further described in detail below in conjunction with the accompanying drawings and specific embodiments. Relative terms such as "first" and "second", etc. herein are only used to distinguish one from another element with the same name, and do not necessarily require or imply any such actual relationship or sequence between these elements.

A fluid control assembly is provided according to embodiments of the present application, which may be applied to a vehicle thermal management system, and in particular to a coolant circulation system, so as to perform communication and switching among flow passages in the thermal management system.

As shown in FIG. 1 to FIG. 6, a fluid control assembly 1000 includes a valve body 10, a valve core 20 and a seal 30. The fluid control assembly 1000 includes an accommodation chamber 101, and the valve body 10 includes a side wall portion 11 which forms at least part of a peripheral wall of the accommodation chamber 101. The valve body 10 may further include a top wall portion and a bottom cover 12. In this embodiment, the accommodation chamber 101 is defined by the side wall portion 11, the top wall portion and the bottom cover 12. Apart from the side wall portion 11, the top wall portion and the bottom cover 12, other components may also be used to define the accommodation chamber 101.

At least part of the valve core 20 is in the accommodation chamber 101 and able to rotate. The seal 30 is located between the side wall portion 11 and the valve core in a radial direction of the side wall portion 11, for sealing the fluid control assembly 1000. Optionally, the fluid control assembly 1000 further includes a driving assembly 40, which includes a driving component, where the driving component may include a motor or a combination of a motor and a transmission gear set. The driving component is drivingly connected to the valve core 20 to drive the valve core 20 to rotate.

Figure 6:
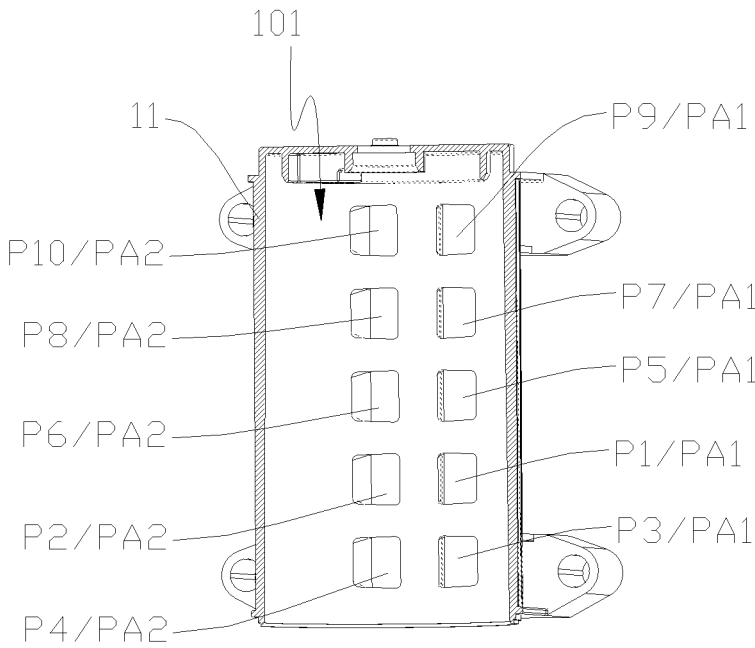
FIG. 6 is a schematic cross-sectional view showing the structure of a valve body according to an embodiment of the present application.
Figure 7:
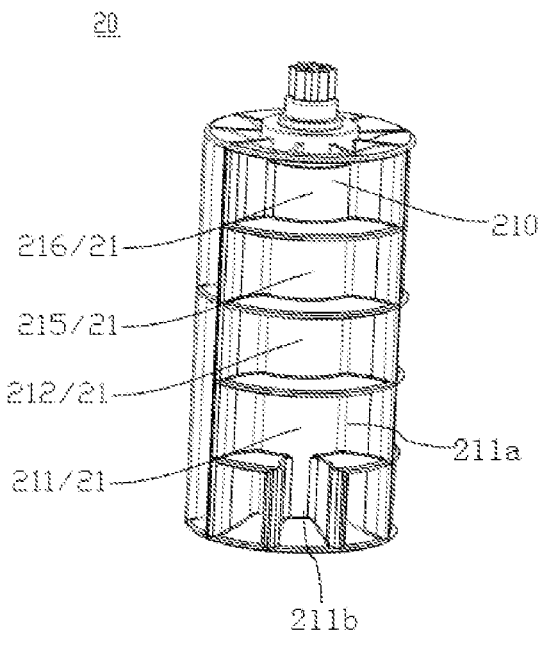
FIG. 7 is a schematic view showing the three-dimensional structure of a valve core according to an embodiment of the present application from a perspective.
Figure 8:
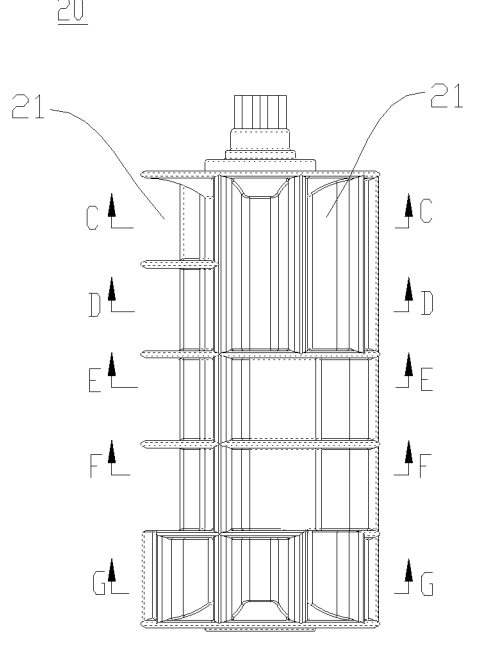
FIG. 8 is a schematic front view of the valve core shown in FIG. 7.
Figure 9:
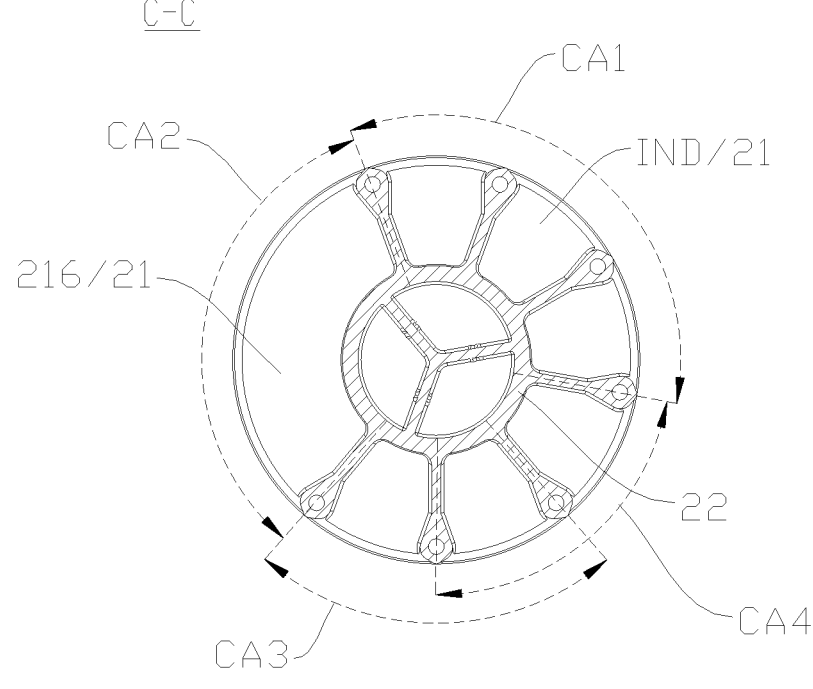
FIG. 9 is a schematic cross-sectional view of the valve core shown in FIG. 8 taken along line C-C.
Figure 10:
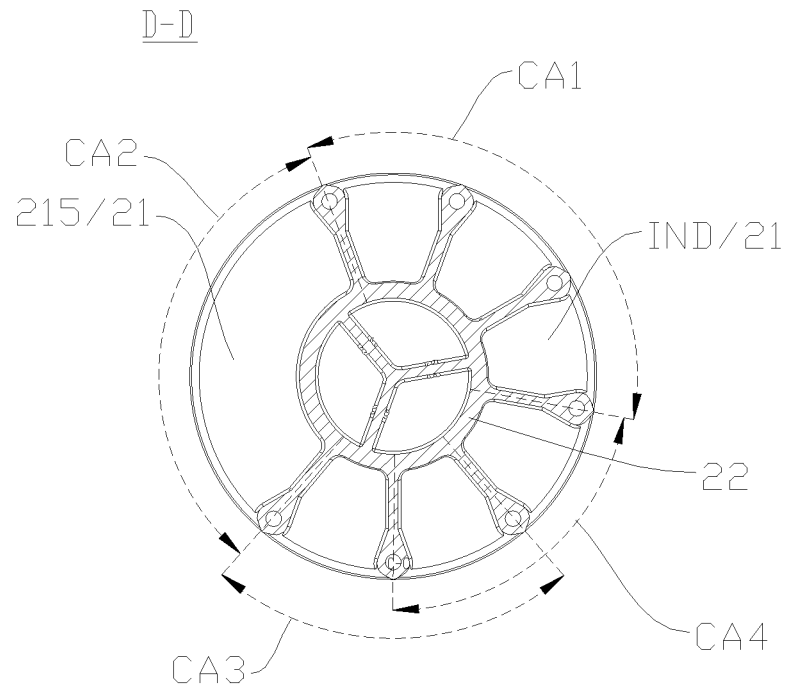
FIG. 10 is a schematic cross-sectional view of the valve core shown in FIG. 8 taken along line D-D.
Figure 11:
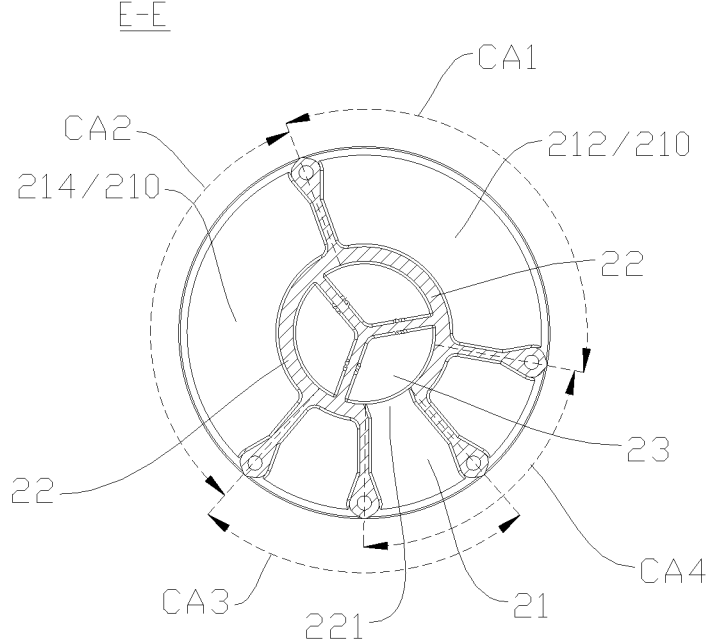
FIG. 11 is a schematic cross-sectional view of the valve core shown in FIG. 8 taken along line E-E.
Figure 12:
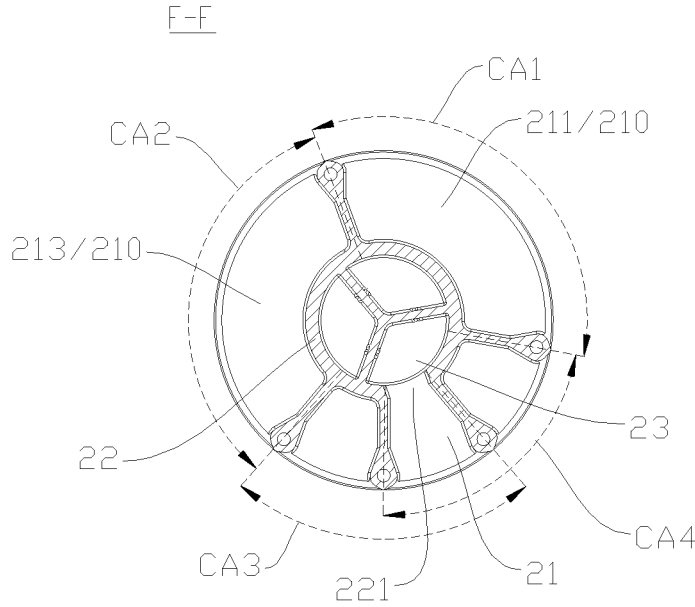
FIG. 12 is a schematic cross-sectional view of the valve core shown in FIG. 8 taken along line F-F.
Figure 13:
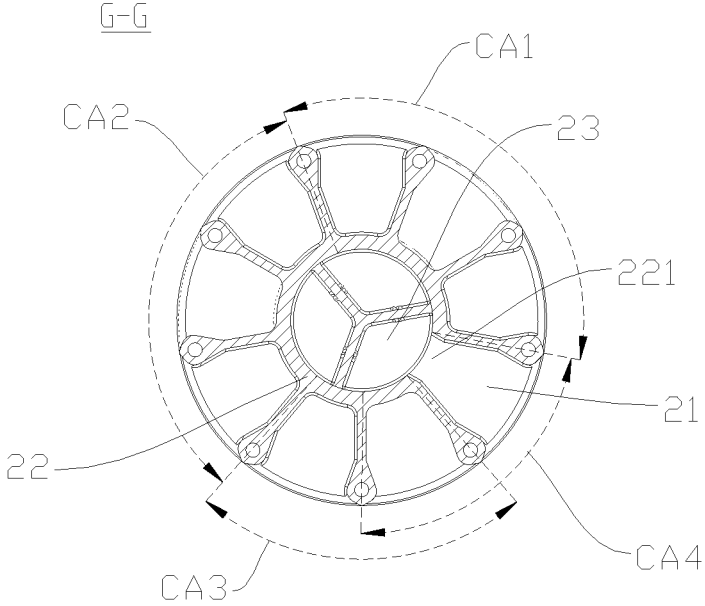
FIG. 13 is a schematic cross-sectional view of the valve core shown in FIG. 8 taken along line G-G.
Figure 14:
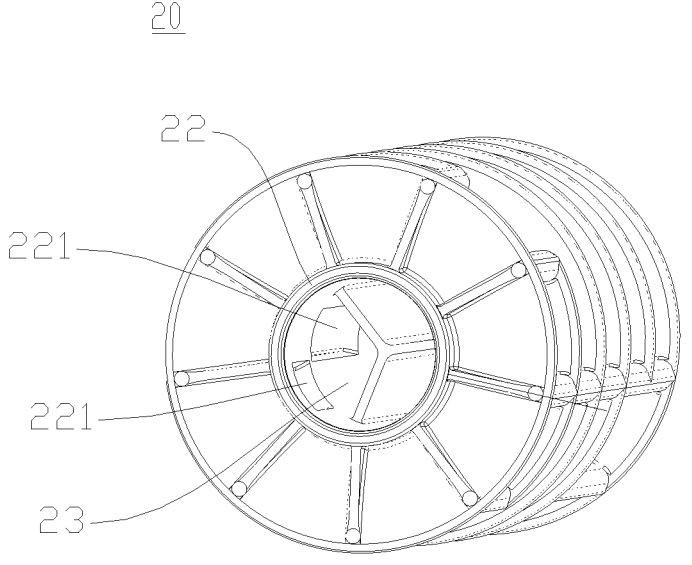
FIG. 14 is a schematic view showing the three-dimensional structure of the valve core shown in FIG. 7 from another perspective.

Further referring to FIG. 1 to FIG. 6, the fluid control assembly 1000 further includes at least two columns of communication ports which are spaced apart in a circumferential direction of the side wall portion 11, the at least two columns of communication ports are located on the side wall portion 11 of the valve body 10, where each column of at least two columns of communication ports includes at least two communication ports spaced apart in an axial direction of the side wall portion 11. Optionally, as shown in FIG. 6, the fluid control assembly 1000 includes two columns of communication ports, namely a first column of communication ports PA1 and a second column of communication ports PA2 arranged adjacently, each of the first column of communication ports PA1 and the second column of communication ports PA2 includes multiple communication ports. Further, in some embodiments, the fluid control assembly 1000 further includes same number of end ports as the communication ports, a fluid can enter or leave the fluid control assembly 1000 through the end ports. The end ports may be arranged into at least two columns of end ports, each column includes at least two end ports spaced apart in the axial direction of the side wall portion 11. For example, the at least two columns of end ports include a first column of end ports PB1 and a second column of end ports PB2, where the end ports in the first column of end ports PB1 are communicated correspondingly with the communication ports in the first column of communication ports PA1, and the end ports in the second column of end ports PB2 are communicated correspondingly with the communication ports in the second column of communication ports PA2. All of the end ports may be arranged in a same plane, to facilitate mounting or integration between the fluid control assembly 1000 and another fluid structure.

As shown in FIGS. 1, 7 to 22, in some embodiments, the valve core 20 includes multiple communication chambers 21, each of the outer communication chambers 21 extends from an exterior surface towards an interior of the valve core 20. The outer communication chamber 21 includes at least one shared communication channel 210, at least part of which extends in a circumferential direction of the valve core. The shared communication channel 210 is provided with an opening facing the side wall portion 11, the opening has a flow cross-sectional area larger than three times a flow cross-sectional area of the communication port, and has an extension distance in the circumferential direction of the valve core 20 that may be larger than three times an extension distance of the communication port in the circumferential direction of the side wall portion 11. As shown in FIGS. 19 to 22, the fluid control assembly 1000 includes at least two operation modes, where in two of the at least two operation modes, at least two communication ports respectively from the at least two columns of the communication ports are in communication through a same shared communication channel 210. By the arrangement above, compared with an arrangement where two individual communication channels are provided to communicate the communication ports in the two operation modes, the fluid control assembly according to the embodiment of the present application is provided with the shared communication channel 210, which can simplify the structure of the fluid control assembly. In this application, the circumferential direction of the side wall portion 11 is parallel to or coincides with the circumferential direction of the valve core 20.

In conjunction with FIG. 6, as shown in FIGS. 19 to 22, in some embodiments, the at least two columns of communication ports include the first column of communication ports PA1 and the second column of communication ports PA2, where the first column of communication ports PA1 includes a first port P1 and a third port P3, and the second column of communication ports PA2 includes a second port P2 and a fourth port P4. The first port P1 and the second port P2 are spaced apart in the circumferential direction of the side wall portion 11, and the third port P3 and the fourth port P4 are spaced apart in the circumferential direction of the side wall portion 11. In two of the operation modes, the shared communication channel that communicates the first port P1, the second P2 and the third port P3 is the same as the shared communication channel that communicates the first port P1, the second P2 and the fourth port P4. As shown in FIGS. 19 to 22, in specific implementation, the shared communication channel 210 of the outer communication chamber 21 includes a first shared channel 211. In an operation mode shown in FIGS. 19 and 20, the first shared channel 211 faces the first port P1, the second P2 and the third port P3 and communicates the first port P1, the second P2 and the third port P3, while in an operation mode shown in FIGS. 21 and 22, the first shared channel 211 faces the first port P1, the second port P2 and the fourth port P4 and communicates the first port P1, the second port P2 and the fourth port P4. By the arrangement above, compared with an arrangement where two individual communication channels are provided to communicate the communication ports in the two operation modes, the fluid control assembly according to the embodiment of the present application is provided with the shared communication channel, which may simplify the structure of the valve core 20 and further simplify the structure of the fluid control assembly. Understandably, the fluid control assembly according to the embodiment of the present application may include the four communication ports described above, or may include five, six, seven, eight, nine, ten or more communication ports, which is not limited in the present application.

In specific implementation, the first shared channel 211 includes a first portion 211a and a second portion 211b. The first portion 211a is located between a second shared channel 212 and the second portion 211b in an axial direction of the valve core 20, a flow cross-sectional area of an opening, facing the side wall portion, of the first portion 211a is larger than three times the flow cross-sectional area of the communication port; and a flow cross-sectional area of an opening, facing the side wall portion, of the second portion 211b is larger than the flow cross-sectional area of the communication port. An orthographic projection of a wall of the second portion 211b in the axial direction of the valve core 20 is at the center of an orthographic projection of a wall of the first portion 211a in the axial direction of the valve core 20.

Figures 19, 20:
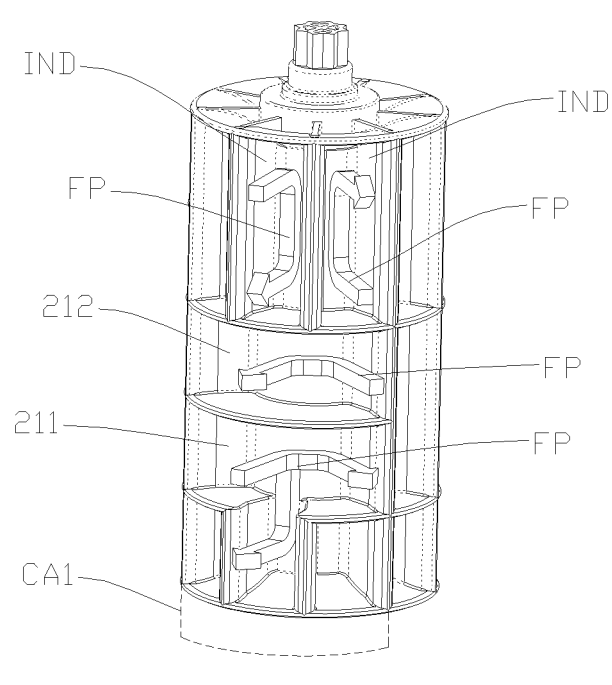
FIG. 19 is a schematic view showing a position of the valve core and a flow relationship of flow passages of the fluid control assembly shown in FIG. 2 in a first operation mode.
FIG. 20 is a schematic block diagram of a communication manner of communication ports of the fluid control assembly shown in FIG. 2 in the first operation mode.

In conjunction with FIGS. 1, 6 to 15, in some embodiments, the first column of communication ports PA1 further includes a fifth port P5, and the second column of communication ports PA2 further includes a sixth port P6, where the fifth port P5 and the sixth port P6 are spaced apart in the circumferential direction of the side wall portion 11. In the axial direction of the side wall portion 11, the first port P1 is located between the third port P3 and the fifth port P5, and the second port P2 is located between the fourth port P4 and the sixth port P6. The valve core 20 includes a first communication structure CA1, which has an outer communication chamber 21 including at least two shared communication channels 210, where the shared communication channels 210 include a first shared channel 211 and a second shared channel 212 that are mutually isolated and are spaced apart in the axial direction of the valve core 20. As shown in FIGS. 19 and 20, the fluid control assembly 1000 includes a first operation mode. In the first operation mode, a part of the first communication structure CA1 of the valve core 20 corresponds to and faces the communication ports, where the first shared channel 211 communicates the first port P1, the second port P2 and the third port P3, and the second shared channel 212 communicates the fifth port P5 and the sixth port P6. The fluid control assembly according to the embodiment of the present application may include the six communication ports described above, or may include more communication ports, which is not limited in the present application. In FIGS. 19 to 30, an arrow is used to illustrate one of flow directions of a flow passage FP of the fluid, where the flow direction of the flow passage FP may be not limited to the flow direction shown in the drawings, and the fluid may flow in an opposite direction.

Figure 21:
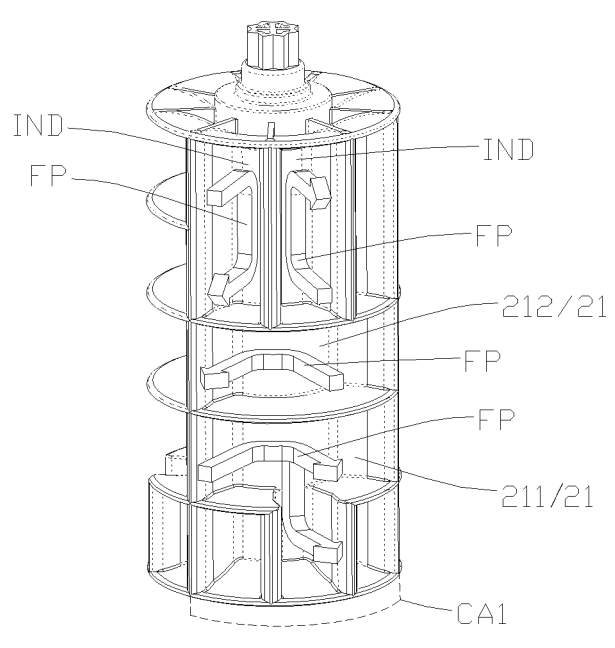
FIG. 21 is a schematic view showing a position of the valve core and a flow relationship of the flow passages of the fluid control assembly shown in FIG. 2 in a second operation mode.
Figure 22:
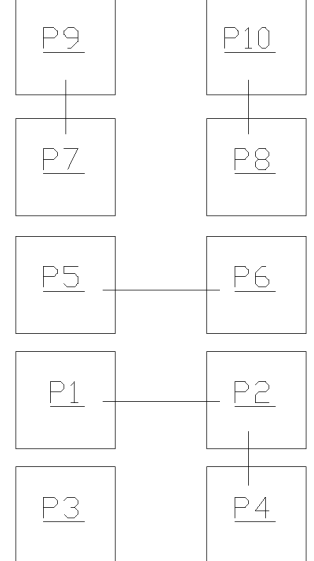
FIG. 22 is a schematic block diagram of a communication manner of the communication ports of the fluid control assembly shown in FIG. 2 in the second operation mode.

As shown in FIGS. 21 and 22, in some embodiments, the fluid control assembly 1000 further includes a second operation mode. In the second operation mode, another part of the first communication structure CA1 of the valve core 20 corresponds to and faces the communication ports, where the first shared channel 211 communicates the first port P1, the second port P2 and the fourth port P4, and the second shared channel 212 communicates the fifth port P5 and the sixth port P6. Multiple communication manners between the communication ports can be implemented through the first communication structure CA1 in the first operation mode and the second operation mode, so that the structure of the valve core can be simplified, and the structure of the fluid control assembly can be simplified.

Figures 23, 24:
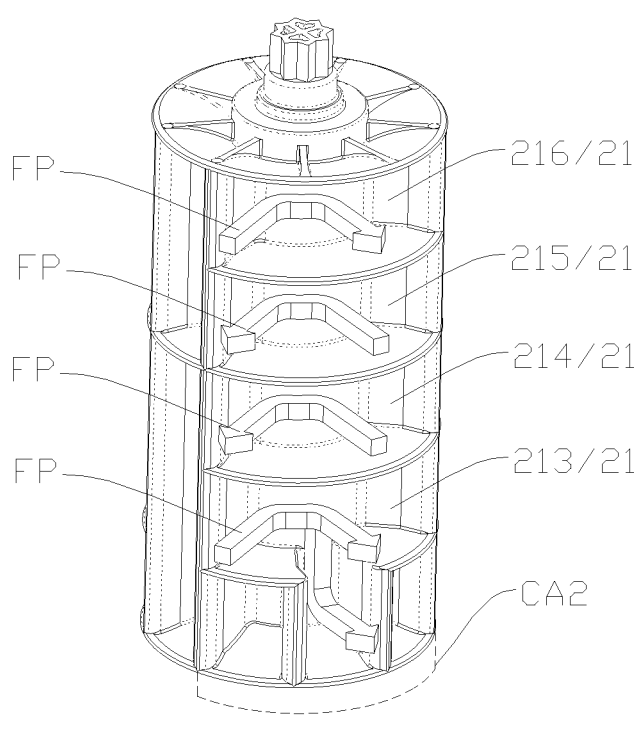
FIG. 23 is a schematic view showing a position of the valve core and a flow relationship of the flow passages of the fluid control assembly shown in FIG. 2 in a third operation mode.
FIG. 24 is a schematic block diagram of a communication manner of the communication ports of the fluid control assembly shown in FIG. 2 in the third operation mode.

In conjunction with FIGS. 8 to 14, and 16, in some embodiments, the valve core 20 further includes a second communication structure CA2, which is isolated and spaced apart from the first communication structure CA1 in the circumferential direction of the valve core 20. The outer communication chamber of the second communication structure CA2 includes a third shared channel 213 and a fourth shared channel 214 that are mutually isolated and are spaced apart in the axial direction of the valve core 20. As shown in FIGS. 23 and 24, the fluid control assembly 1000 further includes a third operation mode. In the third operation mode, a part of the second communication structure CA2 of the valve core 20 corresponds to the communication ports, where the third shared channel 213 communicates the first port P1, the second port P2 and the fourth port P4, the fourth shared channel 214 communicates the fifth port P5 and the sixth port P6, and the third port P3 is blocked.

In specific implementation, the third shared channel 213 includes a third portion 213a and a fourth portion 213b. The third portion 213a is located between the fourth shared channel 214 and the fourth portion. A flow cross-sectional area of an opening, facing the side wall portion, of the third portion 213a is larger than three times the flow cross-sectional area of the communication port. A flow cross-sectional area of an opening, facing the side wall portion, of the fourth portion 213b is larger than the flow cross-sectional area of the communication port. An orthographic projection of a wall of the fourth portion 213*b* in the axial direction of the valve core 20 is at the center of an orthographic projection of a wall of the third portion 213*a* in the axial direction of the valve core 20.

Figure 25:
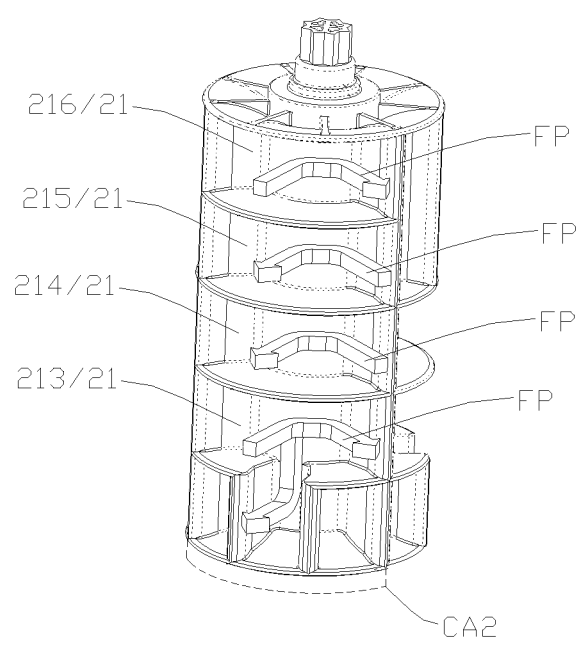
FIG. 25 is a schematic view showing a position of the valve core and a flow relationship of the flow passages of the fluid control assembly shown in FIG. 2 in a fourth operation mode.
Figure 26:
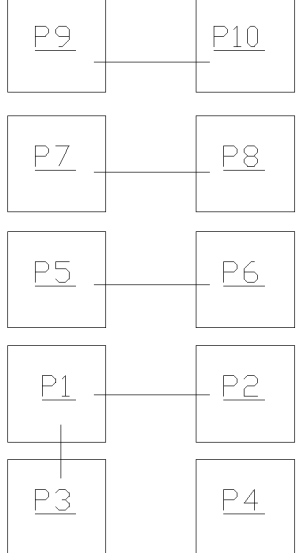
FIG. 26 is a schematic block diagram of a communication manner of the communication ports of the fluid control assembly shown in FIG. 2 in the fourth operation mode.

As shown in FIGS. 25 and 26, in some embodiments, the fluid control assembly 1000 further includes a fourth operation mode. In the fourth operation mode, another part of the second communication structure CA2 of the valve core 20 corresponds to and faces the communication ports, where the third shared channel 213 communicates the first port P1, the second port P2 and the third port P3, the fourth shared channel 214 communicates the fifth port P5 and the sixth port P6, and the fourth port P4 is blocked. By the arrangement above, multiple communication manners among the communication ports can be implemented through the second communication structure CA2 in the third operation mode and the fourth operation mode.

Figure 27:
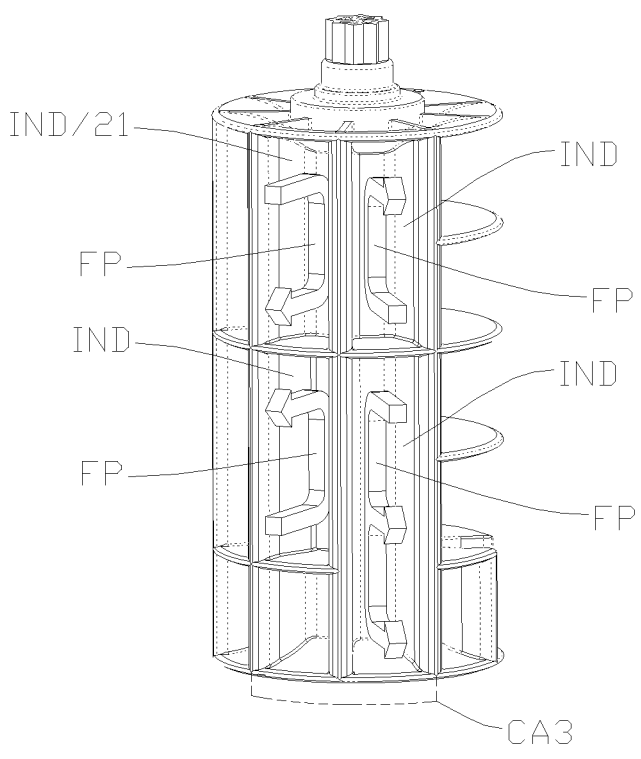
FIG. 27 is a schematic view showing a position of the valve core and a flow relationship of the flow passages of the fluid control assembly shown in FIG. 2 in a fifth operation mode.
Figure 28:
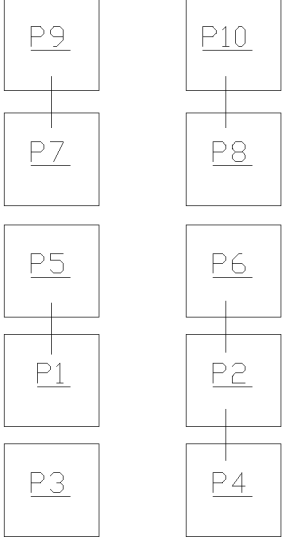
FIG. 28 is a schematic block diagram of a communication manner of the communication ports of the fluid control assembly shown in FIG. 2 in the fifth operation mode.

In conjunction with FIGS. 8 to 14, and 17, in some embodiments, the valve core 20 further includes a third communication structure CA3, which is isolated and spaced apart from the second communication structure CA2 in the circumferential direction of the valve core 20. The outer communication chamber 21 of the third communication structure CA3 includes at least two independent communication channels IND. As shown in FIGS. 27 and 28, the fluid control assembly 1000 further includes a fifth operation mode. In the fifth operation mode, the third communication structure CA3 of the valve core 20 corresponds to and faces the communication ports, where one of the independent communication channels IND communicates the fifth port P5 and the first port P1, another one of the independent communication channels IND communicates the sixth port P6, the second port P2 and the fourth port P4, and the third port P3 is blocked.

Figure 29:
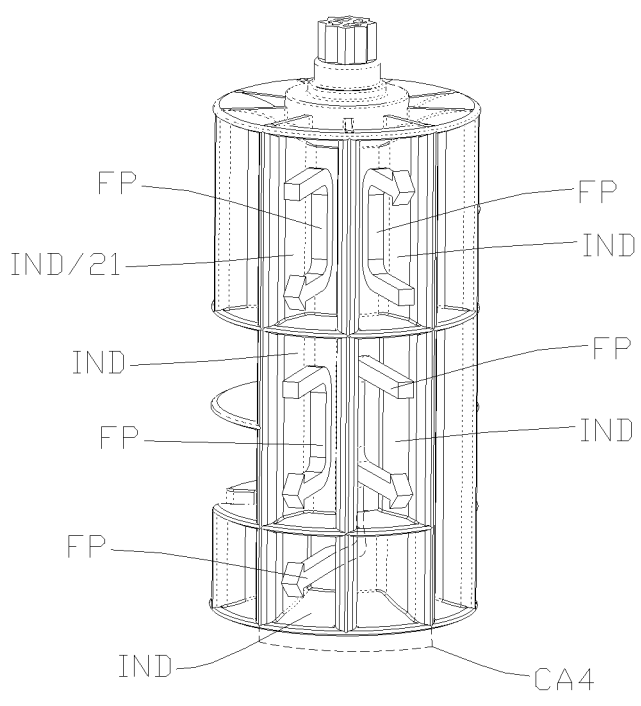
FIG. 29 is a schematic view showing a position of the valve core and a flow relationship of the flow passages of the fluid control assembly shown in FIG. 2 in a sixth operation mode.
Figure 30:
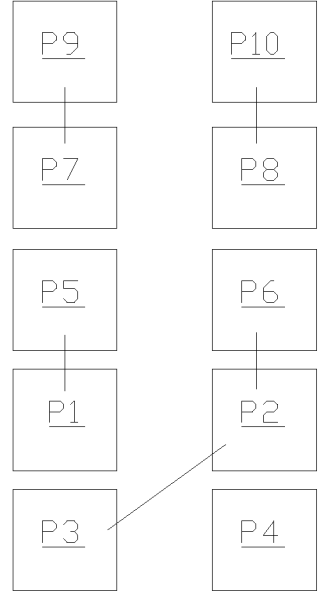
FIG. 30 is a schematic block diagram of a communication manner of the communication ports of the fluid control assembly shown in FIG. 2 in the sixth operation mode.

In conjunction with FIGS. 8 to 14, and 18, in some embodiments, the valve core 20 further includes a fourth communication structure CA4, at least part of which is spaced apart from at least part of the third communication structure CA3 in the circumferential direction of the valve core 20. The fourth communication structure CA4 includes an inner communication chamber 23, which is located at an inner side of the outer communication chamber 21 in a radial direction of the valve core 20. The outer communication chamber 21 of the fourth communication structure CA4 includes at least three independent communication channels IND, two of which is correspondingly communicated with the inner communication chamber 23. In some embodiments, the valve core 20 further includes a partition 22 located between the inner communication chamber 23 and the outer communication chamber 21 in the radial direction of the valve core 20. The partition 22 is provided with through holes 221, through two through holes 221 the inner communication chamber 23 is communicated with the corresponding at least two of the independent communication channels IND. As shown in FIGS. 29 and 30, the fluid control assembly 1000 further includes a sixth operation mode. In the sixth operation mode, the fourth communication structure CA4 of the valve core 20 corresponds to and faces the communication ports, where one of the independent communication channels IND communicates the fifth port P5 and the first port P1, and two of the independent communication channels IND, the inner communication chamber 23 and the through holes 221 communicate the sixth port P6, the second port P2 and the third port P3.

By the arrangement above, when the fluid control assembly is provided with six communication ports, switching among the six operation modes described above can be implemented through the four communication structures. Compared with the arrangement that providing a communication structure for each of the operation modes, the fluid control assembly according to the embodiment of the present application has a simple structure.

Figure 15:
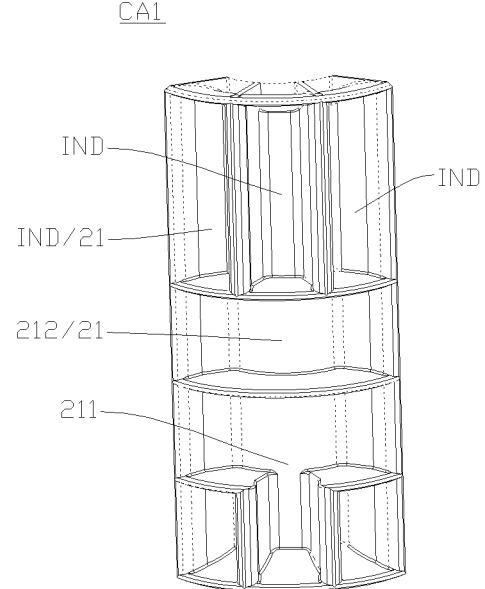
FIG. 15 is a schematic view showing the three-dimensional structure of a first communication structure of the valve core shown in FIG. 7.
Figure 16:
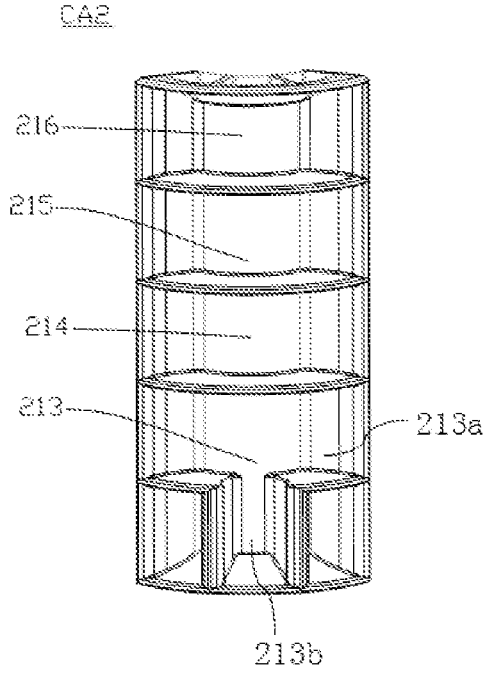
FIG. 16 is a schematic view showing the three-dimensional structure of a second communication structure of the valve core shown in FIG. 7.
Figure 17:
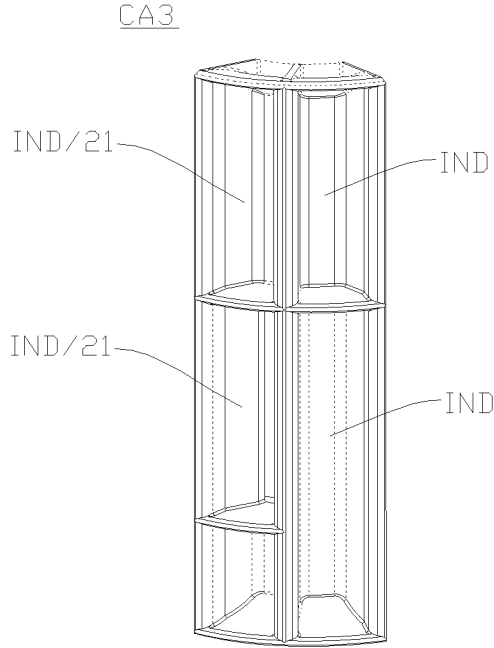
FIG. 17 is a schematic view showing the three-dimensional structure of a third communication structure of the valve core shown in FIG. 7.
Figure 18:
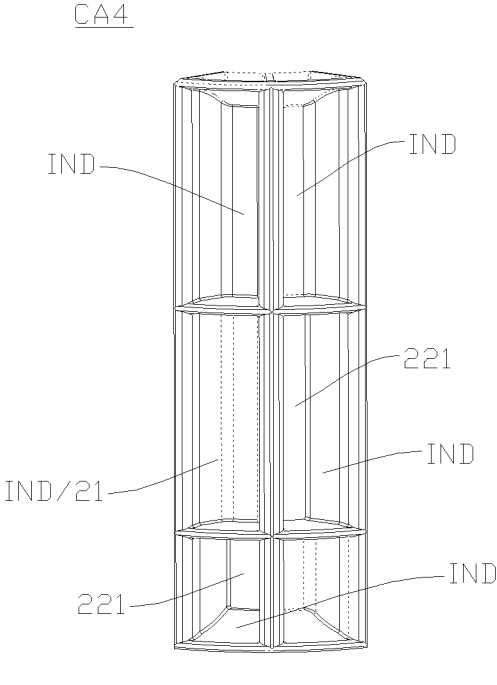
FIG. 18 is a schematic view showing the three-dimensional structure of a fourth communication structure of the valve core shown in FIG. 7.

In conjunction with FIGS. 1, 6 to 18, in some embodiments, the first column of communication ports PA1 further includes a seventh port and a ninth port P9, and the second column of communication ports PA2 further includes an eighth port P8 and a tenth port P10. In the axial direction of the side wall portion 11, the seventh port is located between the ninth port P9 and the fifth port P5, and the eighth port P8 is located between the tenth port P10 and the sixth port P6. The outer communication chamber 21 of the first communication structure CA1 further includes three independent communication channels IND which are mutually isolated, which are also isolated from the shared communication channel 210. Referring to FIG. 15, the independent communication channels IND are isolated from the first shared channel 211 and the second shared channel 212. The second communication structure CA2 further includes a fifth shared channel 215 and a sixth shared channel 216 that are isolated from each other. In the axial direction of the valve core 20, the fifth shared channel 215 is located between the sixth shared channel 216 and the fourth shared channel 214. The outer communication chamber 21 of the third communication structure CA3 includes at least four independent communication channels IND mutually isolated, and the outer communication chamber 21 of the fourth communication structure CA4 includes at least five independent communication channels IND which are mutually isolated, where two of the independent communication channels IND are communicated via the through hole 221 on the partition 22. Understandably, the fluid control assembly according to the embodiment of the present application may include the ten communication ports described above, or may include more communication ports, which is not limited in the present application. Understandably, a channel being isolated from another channel herein means that the two channels are not in communication with each other in structure of the valve core, while the two channels may be communicated via another component in a thermal management system; one of the communication ports being isolated from another one of the communication ports means that the two channels are not in communication with each other in structure of the side wall portion, while the two communication ports may be communicated via the communication chamber in the valve core or another component in the thermal management system.

In view of this, as shown in FIGS. 19 to 22, in the first operation mode and the second operation mode, the seventh port and the ninth port P9 are in communication through one of the independent communication channels IND of the first communication structure CA1, and the eighth port P8 and the tenth port P10 are in communication through another one of the independent communication channels IND of the first communication structure CA1. As shown in FIGS. 23 to 26, in both the third operation mode and the fourth operation mode, the seventh port and the eighth port P8 are in communication through the fifth shared channel 215, and the ninth port P9 and the tenth port P10 are in communication through the sixth shared channel 216. As shown in FIGS. 27 and 28, in the fifth operation mode, the seventh port and the ninth port P9 are in communication through one of the independent communication channels IND of the third communication structure CA3, and the eighth port P8 and the tenth port P10 are in communication through another one of the independent communication channels IND of the third communication structure CA3. As shown in FIGS. 29 and 30, in the sixth operation mode, the seventh port and the ninth port P9 are in communication through one of the independent communication channels IND of the fourth communication structure CA4, and the eighth port P8 and the tenth port P10 are in communication through another one of the independent communication channels IND of the fourth communication structure CA4. Understandably, to communicate the communication ports through the communication chamber, the valve may be rotated to a position at which the communication structure faces the communication ports.

In summary, the fluid control assembly 1000 according to the embodiment of the present application includes at least two columns of communication ports, each column of communication ports includes at least two communication ports spaced apart in an axial direction of the side wall portion 11, and a valve core 20 is provided with at least one shared communication channel. In two of the operation modes, at least two of the communication ports respectively from the at least two columns are in communication through the same shared communication channel. Compared with the arrangement that two independent communication channels are provided to achieve communication between at least two of the communication ports in the two operation modes, the fluid control assembly 1000 according to the embodiment of the present application is provided with the shared communication channel, which can simplify the structure of the fluid control assembly 1000, and can realize different communication manners between multiple communication ports.

It is noted that, the embodiments described above are merely used to illustrate the present application, rather than limiting technical solutions of the present application, for example, the directional terms such as "front", "back", "right", "left", "up", "down" and so on. Although the present application has been described in detail in conjunction with the above embodiments, it should be understood by those skilled in the art that, various forms of modifications, combination and equivalent replacements may be made to the present application. Any technical solutions and improvements thereof without departing from the scope of the present application will fall in the scope of protection of the present application.

The invention claimed is:

1. A fluid control assembly, comprising an accommodation chamber, wherein the fluid control assembly comprises a valve body and a valve core, the valve body comprises a side wall portion that forms at least part of a peripheral wall of the accommodation chamber;

the fluid control assembly is provided with at least two columns of communication ports which are spaced apart in a circumferential direction of the side wall portion, the at least two columns of communication ports are located on the valve body, wherein each column of the at least two columns of communication ports comprises at least two communication ports spaced apart in an axial direction of the side wall portion;

at least part of the valve core is in the accommodation chamber, the valve core comprises an outer communication chamber, and the outer communication chamber comprises at least one shared communication channel; wherein the fluid control assembly comprises at least two operation modes, in two of the at least two operation modes, at least two communication ports respectively from the at least two columns of communication ports are in communication through a same one of the at least one shared communication channel; and wherein the at least two columns of communication ports comprise a first column of communication ports and a second column of communication ports arranged adjacently, the first column of communication ports comprises a first port and a third port, and the second column of communication ports comprises a second port and a fourth port; wherein the first port and the second port are spaced apart in the circumferential direction of the side wall portion, and the third port and the fourth port are spaced apart in the circumferential direction of the side wall portion; and wherein in a first of the two of the operation modes, one of the at least one shared communication channel is configured to communicate the first port, the second and the third port; and in a second of the two of the operation modes, the one of the at least one shared communication channel is configured to communicate the first port, the second and the fourth port.

2. The fluid control assembly according to claim 1, wherein a flow cross-sectional area of an opening, facing the side wall portion, of each of the at least one shared communication channel is larger than three times a flow cross-sectional area of each of the corresponding communication ports.

3. The fluid control assembly according to claim 2, wherein the first column of communication ports further comprises a fifth port, and the second column of communication ports further comprises a sixth port, wherein the fifth port and the sixth port are spaced apart in the circumferential direction of the side wall portion;

in the axial direction of the side wall portion, the first port is located between the third port and the fifth port, and the second port is located between the fourth port and the sixth port;

the valve core comprises a first communication structure, an outer communication chamber of the first communication structure comprises a first shared channel and a second shared channel that are mutually isolated; and wherein in the first operation mode of the at least two operation modes, in which a part of the first communication structure of the valve core corresponds to the at least two columns of communication ports, wherein the first port, the second port and the third port are in communication through the first shared channel, and the fifth port and the sixth port are in communication through the second shared channel.

4. The fluid control assembly according to claim 3, wherein in the second operation mode of the at least two operation modes, in which another part of the first communication structure of the valve core corresponds to the at least two columns of communication ports, wherein the first port, the second port and the fourth port are in communication through the first shared channel, and the fifth port and the sixth port are in communication through the second shared channel.

5. The fluid control assembly according to claim 4, wherein the first shared channel comprises a first portion and a second portion, and the first portion is located between the second shared channel and the second portion in an axial direction of the valve core;

a flow cross-sectional area of an opening, facing the side wall portion, of the first portion is larger than three times the flow cross-sectional area of the communication port, and a flow cross-sectional area of an opening, facing the side wall portion, of the second portion is larger than the flow cross-sectional area of the communication port; and an orthographic projection of a wall of the second portion in the axial direction of the valve core is at a center of an orthographic projection of a wall of the first portion in the axial direction of the valve core.

6. The fluid control assembly according to claim 5, wherein the valve core further comprises a second communication structure, which is isolated from the first communication structure and spaced apart from the first communication structure in an circumferential direction of the valve core;

an outer communication chamber of the second communication structure comprises a third shared channel and a fourth shared channel that are mutually isolated; and the fluid control assembly further comprises a third operation mode, in which a part of the second communication structure of the valve core corresponds to the at least two columns of communication ports, wherein the first port, the second port and the fourth port are in communication through the third shared channel, and the fifth port and the sixth port are in communication through the fourth shared channel.

7. The fluid control assembly according to claim 4, wherein the valve core further comprises a second communication structure, which is isolated from the first communication structure and spaced apart from the first communication structure in an circumferential direction of the valve core;

an outer communication chamber of the second communication structure comprises a third shared channel and a fourth shared channel that are mutually isolated; and the fluid control assembly further comprises a third operation mode, in which a part of the second communication structure of the valve core corresponds to the at least two columns of communication ports, wherein the first port, the second port and the fourth port are in communication through the third shared channel, and the fifth port and the sixth port are in communication through the fourth shared channel.

8. The fluid control assembly according to claim 3, wherein the valve core further comprises a second communication structure, which is isolated from the first communication structure and spaced apart from the first communication structure in an circumferential direction of the valve core;

an outer communication chamber of the second communication structure comprises a third shared channel and a fourth shared channel that are mutually isolated; and the fluid control assembly further comprises a third operation mode, in which a part of the second communication structure of the valve core corresponds to the at least two columns of communication ports, wherein the first port, the second port and the fourth port are in communication through the third shared channel, and the fifth port and the sixth port are in communication through the fourth shared channel.

9. The fluid control assembly according to claim 8, further comprising a fourth operation mode, in which another part of the second communication structure of the valve core corresponds to the at least two columns of communication ports, wherein the first port, the second port and the third port are in communication through the third shared channel, and the fifth port and the sixth port are in communication through the fourth shared channel.

10. The fluid control assembly according to claim 9, wherein the third shared channel comprises a third portion and a fourth portion, and the third portion is located between the fourth shared channel and the fourth portion in an axial direction of the valve core;

a flow cross-sectional area of an opening, facing the side wall portion, of the third portion is larger than three times the flow cross-sectional area of the communication port, and a flow cross-sectional area of an opening, facing the side wall portion, of the fourth portion is larger than the flow cross-sectional area of the communication port; and an orthographic projection of a wall of the fourth portion in the axial direction of the valve core is at a center of an orthographic projection of a wall of the third portion in the axial direction of the valve core.

11. The fluid control assembly according to claim 10, wherein the valve core further comprises a third communication structure, which is isolated from the second communication structure and spaced apart from the second communication structure in the circumferential direction of the valve core;

an outer communication chamber of the third communication structure comprises at least two independent communication channels; and the fluid control assembly further comprises a fifth operation mode, in which the third communication structure of the valve core corresponds to the at least two columns of communication ports, wherein the fifth port and the first port are in communication through one of the at least two independent communication channels, and the sixth port, the second port and the fourth port are in communication through another one of the at least two independent communication channels.

12. The fluid control assembly according to claim 9, wherein the valve core further comprises a third communication structure, which is isolated from the second communication structure and spaced apart from the second communication structure in the circumferential direction of the valve core;

an outer communication chamber of the third communication structure comprises at least two independent communication channels; and the fluid control assembly further comprises a fifth operation mode, in which the third communication structure of the valve core corresponds to the at least two columns of communication ports, wherein the fifth port and the first port are in communication through one of the at least two independent communication channels, and the sixth port, the second port and the fourth port are in communication through another one of the at least two independent communication channels.

US 12,601,410 B2

13

14

13. The fluid control assembly according to claim 12, wherein the valve core further comprises a fourth communication structure, at least part of the fourth communication structure is spaced apart from at least part of the third communication structure in the circumferential direction of the valve core;

the fourth communication structure comprises an inner communication chamber, which is located at an inner side of the outer communication chamber in a radial direction of the valve core;

the outer communication chamber of the fourth communication structure comprises at least three independent communication channels, two of which is correspondingly communicated with the inner communication chamber; and the fluid control assembly further comprises a sixth operation mode, in which the fourth communication structure of the valve core corresponds to the at least two columns of communication ports, wherein the fifth port and the first port are in communication through the other one of the at least three independent communication channels, and the sixth port, the second port and the third port are in communication through the two of the at least three independent communication channels and the corresponding inner communication chamber.

14. The fluid control assembly according to claim 13, wherein the valve core further comprises a partition located between the inner communication chamber and the independent communication channels in the radial direction of the valve core; and the partition comprises a through hole, through which the inner communication chamber is correspondingly communicated with at least two of the independent communication channels.

15. The fluid control assembly according to claim 14, wherein the first column of communication ports further comprises a seventh port and a ninth port, and the second column of communication ports further comprises an eighth port and a tenth port, wherein in the axial direction of the side wall portion, the seventh port is located between the ninth port and the fifth port, and the eighth port is located between the tenth port and the sixth port; and the outer communication chamber of the first communication structure further comprises three independent communication channels mutually isolated, which are isolated from the shared communication channel;

the outer communication chamber of the second communication structure further comprises a fifth shared channel and a sixth shared channel that are mutually isolated;

the number of the independent communication channels of the outer communication chamber of the third communication structure is at least four; and the number of the independent communication channels of the outer communication chamber of the fourth communication structure is at least five.

16. The fluid control assembly according to claim 13, wherein the first column of communication ports further comprises a seventh port and a ninth port, and the second column of communication ports further comprises an eighth port and a tenth port, wherein in the axial direction of the side wall portion, the seventh port is located between the ninth port and the fifth port, and the eighth port is located between the tenth port and the sixth port; and the outer communication chamber of the first communication structure further comprises three independent communication channels mutually isolated, which are isolated from the shared communication channel;

the outer communication chamber of the second communication structure further comprises a fifth shared channel and a sixth shared channel that are mutually isolated;

the number of the independent communication channels of the outer communication chamber of the third communication structure is at least four; and the number of the independent communication channels of the outer communication chamber of the fourth communication structure is at least five.

17. The fluid control assembly according to claim 16, wherein in the first operation mode and the second operation mode, the seventh port and the ninth port are in communication through one of the independent communication channels of the first communication structure, and the eighth port and the tenth port are in communication through another one of the independent communication channels of the first communication structure;

in the third operation mode and the fourth operation mode, the seventh port and the eighth port are in communication through the fifth shared channel, and the ninth port and the tenth port are in communication through the sixth shared channel;

in the fifth operation mode, the seventh port and the ninth port are in communication through one of the independent communication channels of the third communication structure, and the eighth port and the tenth port are in communication through another one of the independent communication channels of the third communication structure; and in the sixth operation mode, the seventh port and the ninth port are in communication through one of the independent communication channels of the fourth communication structure, and the eighth port and the tenth port are in communication through another one of the independent communication channels of the fourth communication structure.

* * * * *